United States Patent
Nozawa

(10) Patent No.: US 7,443,380 B2
(45) Date of Patent: Oct. 28, 2008

(54) DISPLAY APPARATUS

(75) Inventor: Shingo Nozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 11/004,964

(22) Filed: Dec. 7, 2004

(65) Prior Publication Data
US 2005/0140646 A1 Jun. 30, 2005

(30) Foreign Application Priority Data
Dec. 11, 2003 (JP) ............................. 2003-413723

(51) Int. Cl.
*G09G 5/00* (2006.01)
(52) U.S. Cl. ...................................... 345/156; 345/169
(58) Field of Classification Search ................. 345/126, 345/104, 156–179, 901, 184, 856–862; 257/40
See application file for complete search history.

(56) References Cited

U.S. PATENT DOCUMENTS

| | | | | |
|---|---|---|---|---|
| 6,137,468 A | * | 10/2000 | Martinez et al. | 345/649 |
| 6,567,101 B1 | * | 5/2003 | Thomas | 345/649 |
| 6,940,092 B2 | * | 9/2005 | Yoshida et al. | 257/40 |
| 7,109,967 B2 | * | 9/2006 | Hioki et al. | 345/104 |
| 7,196,689 B2 | * | 3/2007 | Moriyama | 345/156 |
| 2004/0008191 A1 | * | 1/2004 | Poupyrev et al. | 345/184 |
| 2004/0239687 A1 | * | 12/2004 | Idesawa et al. | 345/623 |
| 2006/0274036 A1 | * | 12/2006 | Hioki et al. | 345/156 |

* cited by examiner

*Primary Examiner*—Nitin Patel
(74) *Attorney, Agent, or Firm*—Fitzpatrick, Cella, Harper & Scinto

(57) ABSTRACT

A display apparatus includes a display which displays information on a display screen, a housing body which surrounds the display, and a detector installed in the housing body which detects a bend position and direction of the housing body being bent along with the display. In addition, a controller changes the information to be displayed on the display screen, according to the bend position and direction detected by the detector.

6 Claims, 5 Drawing Sheets

DISPLAY APPARATUS

BACKGROUND OF THE INVENTION

1. Field of the Invention

The present invention relates to a display apparatus for displaying information and an information apparatus including a display portion for displaying information.

2. Related Background Art

With recent development in information apparatuses, the needs for browsing various information such as documents and images are increasing. With these needs, studies and developments of thin display devices are made vigorously.

Many thin and light portable information apparatuses are commercially available which adopt thin display devices, typically liquid crystal panels and organic EL panels. These apparatuses do not use conventional keyboards, but use a small number of operation buttons or a touch panel operated with a pen or a finger. The display portion occupies most of the apparatus body. Technologies of forming a display portion on a film-like body are under development, and an electronic paper capable of being perused in a sense of a paper sheet are expected to be realized in the near future.

The conventional apparatuses described above are, however, associated with the following problems. It is difficult to make compact the apparatus body if operation buttons are disposed thereon. Portability of an apparatus is degraded if it requires to use a specific instrument such as a pen. Since the touch panel is operated with a finger, the display surface is contaminated with fingerprints and a user is required to clean it.

SUMMARY OF THE INVENTION

The present invention has been made in consideration of the above-described problems and aims to provide a display device which is easy to use intuitively and very compact without using operation buttons or the like.

In order to solve the above-described problems, a preferred embodiment of the present invention discloses a display device or an information apparatus comprising: display means for displaying information on a surface of a body; detecting means for detecting an external stimulus to the body; and control means for updating information to be displayed on the display means in accordance with a detection signal from the detecting means.

Other objects and features of the present invention will become more apparent from the following embodiments when read in conjunction with the accompanying drawings.

DETAILED DESCRIPTION OF THE PREFERRED EMBODIMENTS

First Embodiment

The first embodiment of the present invention will be described with reference to FIGS. 1 to 3.

Figure 1:
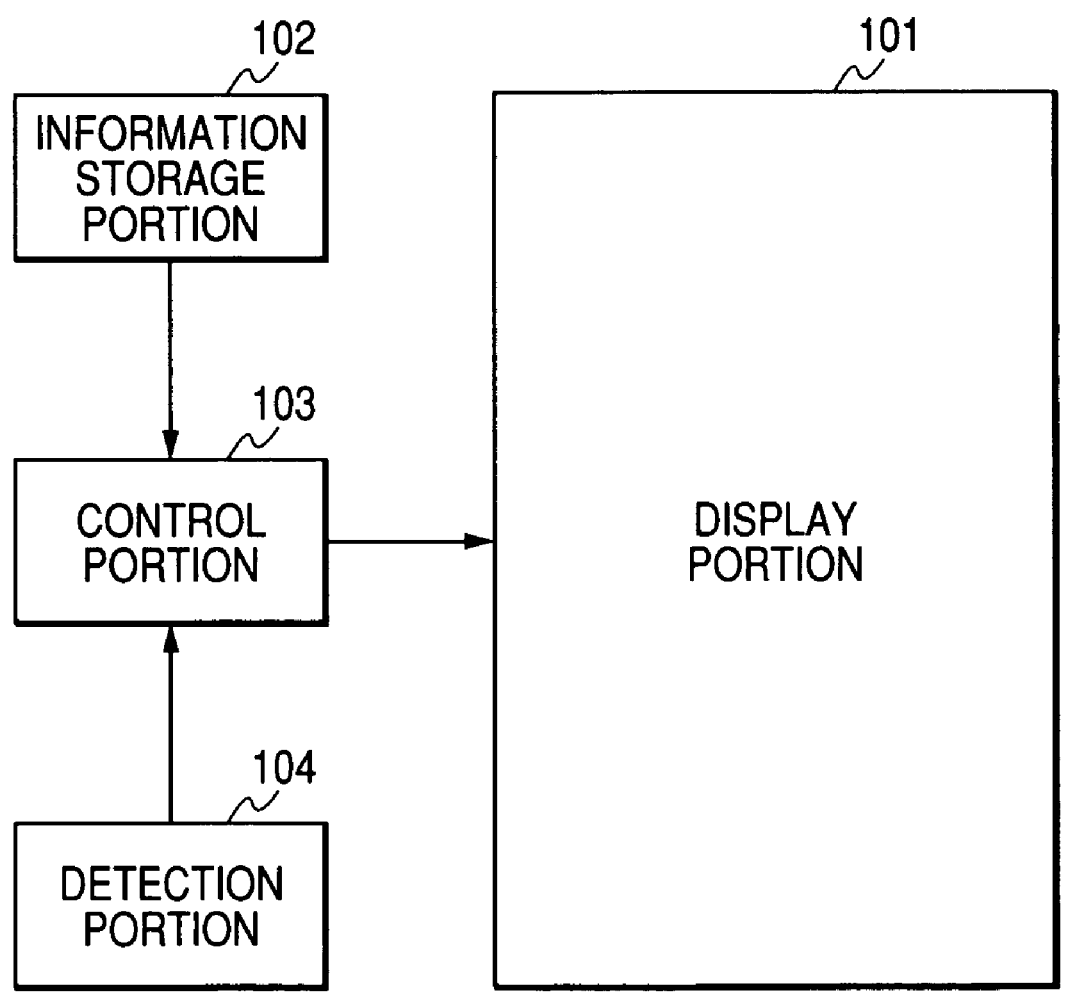
FIG. 1 is a block diagram showing a first embodiment of the present invention.

FIG. 1 is a block diagram showing the structure of a display device according to the first embodiment of the present invention. The display device of the first embodiment is used for perusing electronic book data recorded in a built-in information medium.

In FIG. 1, reference numeral 101 denotes a display portion, reference numeral 102 denotes an information storage portion, reference numeral 103 denotes a control portion and reference numeral 104 denotes a detection portion.

The display portion 101 is a very thin display device such as a liquid crystal panel and an organic EL panel.

The information storage portion 102 is a recording medium such as a flash memory or a CD-ROM, and stores information such as electronic book data. The control portion 103 is constituted of a microcomputer or the like, and has a roll of controlling each portion connected to the control portion 103. The detection portion 104 detects an external stimulus to the display device and supplies a detection signal to the control unit 103.

Figure 2:
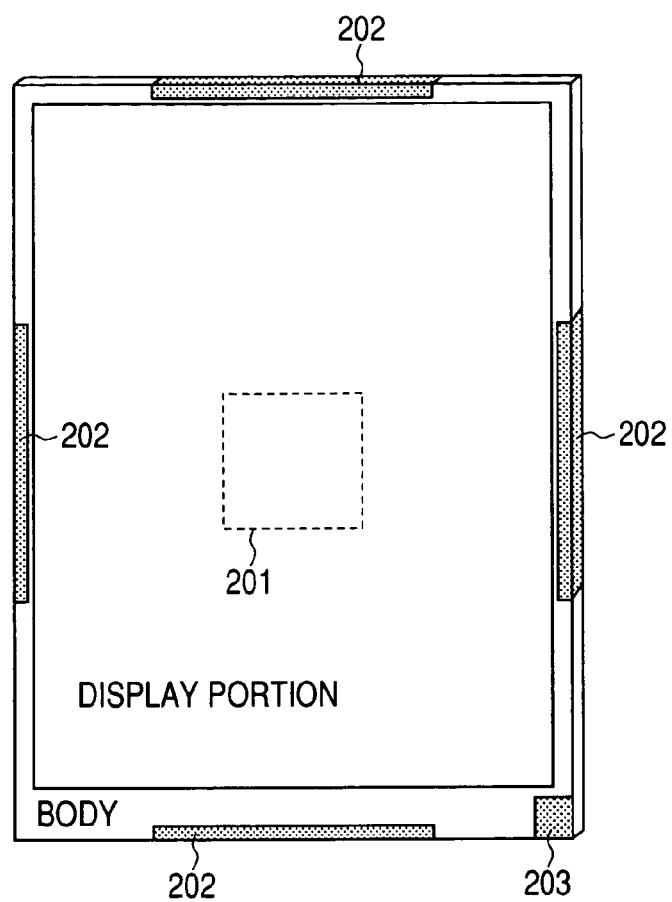
FIG. 2 is a perspective view of a display device according to the first embodiment of the present invention.

FIG. 2 is a perspective view of the display device according to the first embodiment of the present invention.

As shown in FIG. 2, since the display portion 101 is thin, the whole device has a very thin structure. Circuit components of the control unit 103 and the like are concentratedly disposed in a peripheral area of the display portion or disposed on the rear surface of the display portion 101. The display device can therefore be handled with ease, as if the display portion 101 itself is the whole display device. The detection portion 104 is disposed in regions 201, 202 and 203 shown in FIG. 2. The region 201 is a center of gravity area (a surface opposite to the display surface) of the device, the region 202 is upper/lower/right/left sides of the device, and the region 203 is an area near one corner of the device.

Next, description will be made on an example of the operation of the device having the structure shown in FIG. 1.

The control portion 103 reads out information recorded in the information storage portion 102 and displays it on the display portion 101. For example, a user carries electronic book data such as a map and peruses it. If the user wants to update the display of the electronic book data, e.g., if the user wants to scroll the display area of a map, this embodiment attains this data update by lightly shaking the device in a scroll direction.

Figure 3:
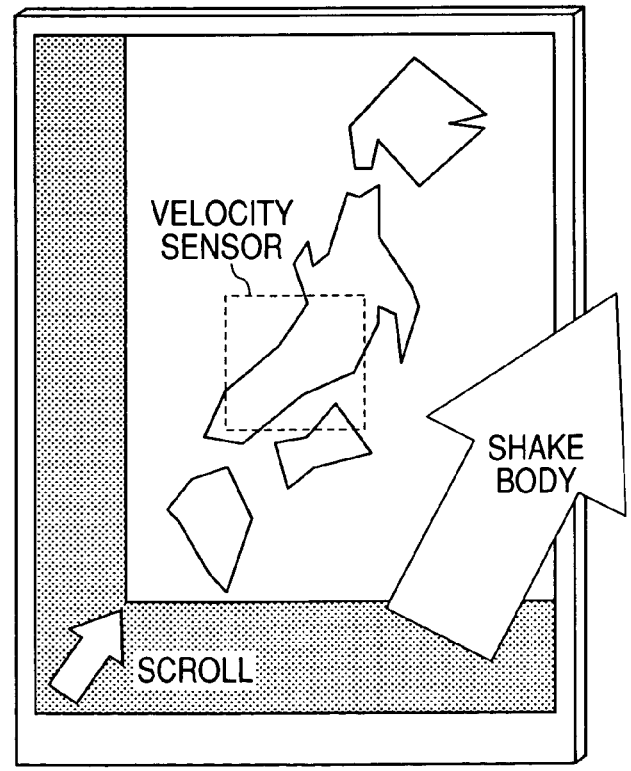
FIG. 3 is a diagram illustrating an example of an operation according to the first embodiment of the present invention.

FIG. 3 is a diagram illustrating the operation of the device according to the first embodiment. The detection portion 104 is constituted of a speed sensor disposed in the center of gravity area of the display device, and detects a shake direction and a shake width of the device. The speed sensor can be realized easily by using a gyro member, which is used by an anti-vibration mechanism of a camera or the like. The control portion 103 receives the shape direction and width detected with the speed sensor, reads electronic information from the information storage portion 102 in accordance with the values of the shake direction and width, and displays the display contents on the display portion 101.

According to the first embodiment, although the detection portion 104 is constituted of a speed sensor, if it is constituted of an acceleration sensor, a shake and a vibration of the device can be detected to realize the operation similar to the first embodiment.

If the detection portion 104 is constituted of an angular velocity sensor, a shake and a rotation of the device can be detected to realize the operation similar to the first embodiment.

Second Embodiment

Figure 4:
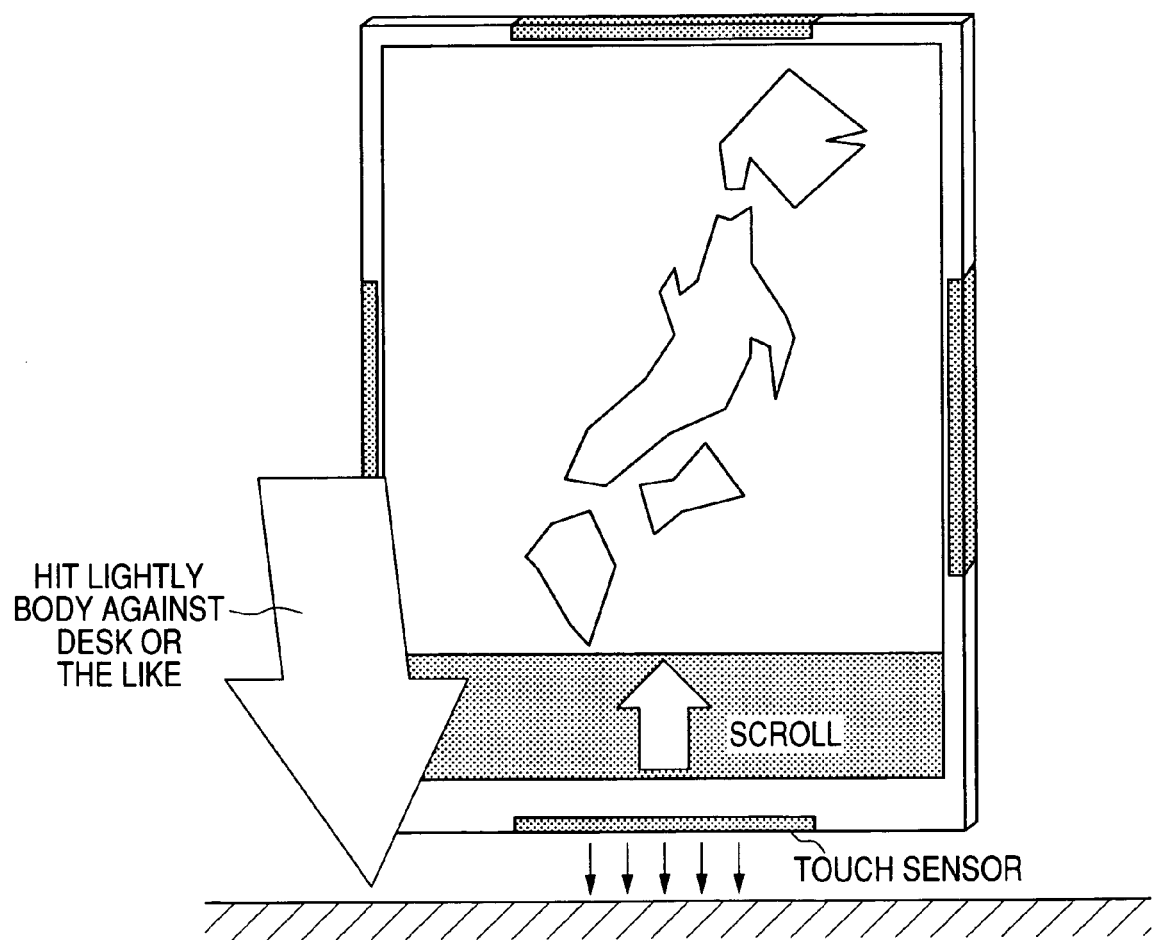
FIG. 4 is a diagram illustrating an example of an operation according to a second embodiment of the present invention.

The second embodiment will be described. The block diagram of FIG. 1 is also used for the second embodiment. A difference of the operation will be described with reference to FIG. 4. FIG. 4 is a diagram illustrating the operation of the second embodiment of the present invention. The detection portion 104 is constituted of a touch sensor and detects an impact applied to the side of the device. For example, in this embodiment, if a user wants to update the display area of a map displayed on the display portion 101 from the lower area to the upper area, the display is scrolled by lightly hitting the lower side of the device against a desk or the like. Similarly, a scroll in another direction can be realized by hitting an upper, right or left side against the desk or hitting it with a hand.

Third Embodiment

Figure 5A:
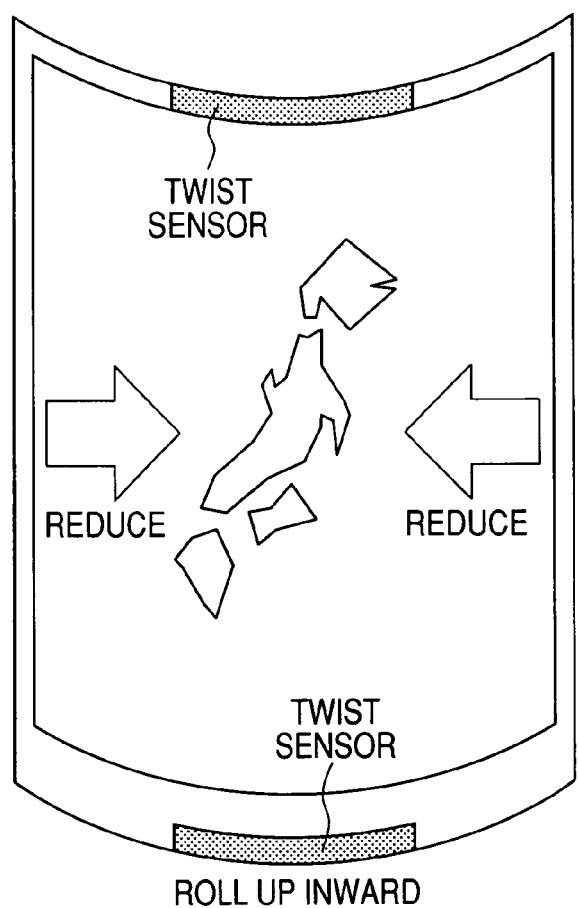
FIGS. 5A and 5B are diagrams illustrating examples of an operation according to a third embodiment of the present invention.
Figure 5B:
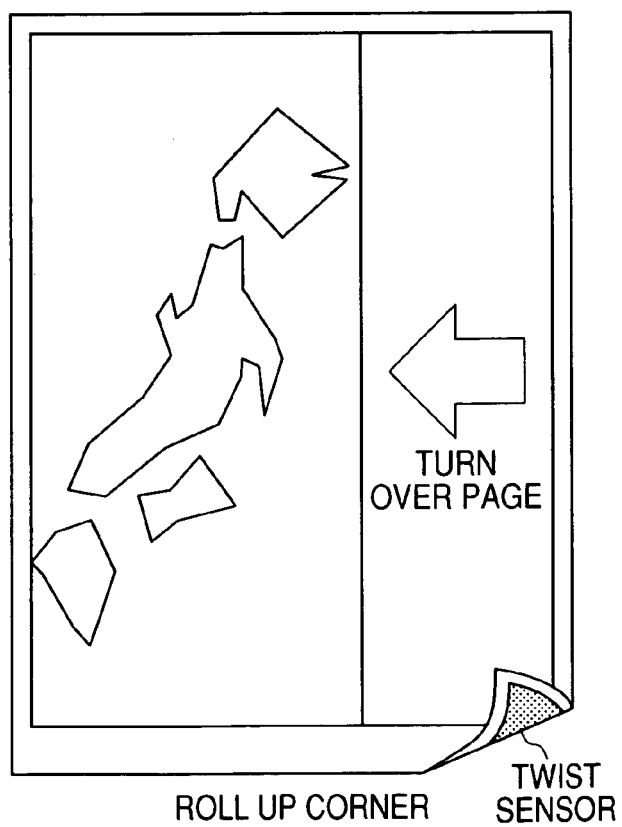

The third embodiment will be described. The block diagram of FIG. 1 is also used for the third embodiment. A difference of the operation will be described with reference to FIGS. 5A and 5B. FIGS. 5A and 5B are diagrams illustrating the operations of the third embodiment of the present invention. The detection portion 104 is constituted of twist sensors disposed on the upper and lower side surfaces of the display device, and detects a deformation of the display device body. For example, as shown in FIG. 5A, the twist sensor detects a deformation of rolling up inward the display surface, and a map displayed on the display portion 101 is reduced in size in accordance with a detection signal from the twist sensor, or the map is enlarged in size by detecting a deformation of rolling up outward the display surface. Similarly, as shown in FIG. 5B, a twist sensor is disposed in an area near a lower right corner of the device, and a displayed page can be turned over by an intuitive operation of rolling up the corner of the device.

The scope of the present invention also includes a display device which detects a deformation of the device with twist sensors and corrects a strain of the display portion 101 to be caused by the device body deformation to thereby improve a visual recognition.

Fourth Embodiment

Figure 6:
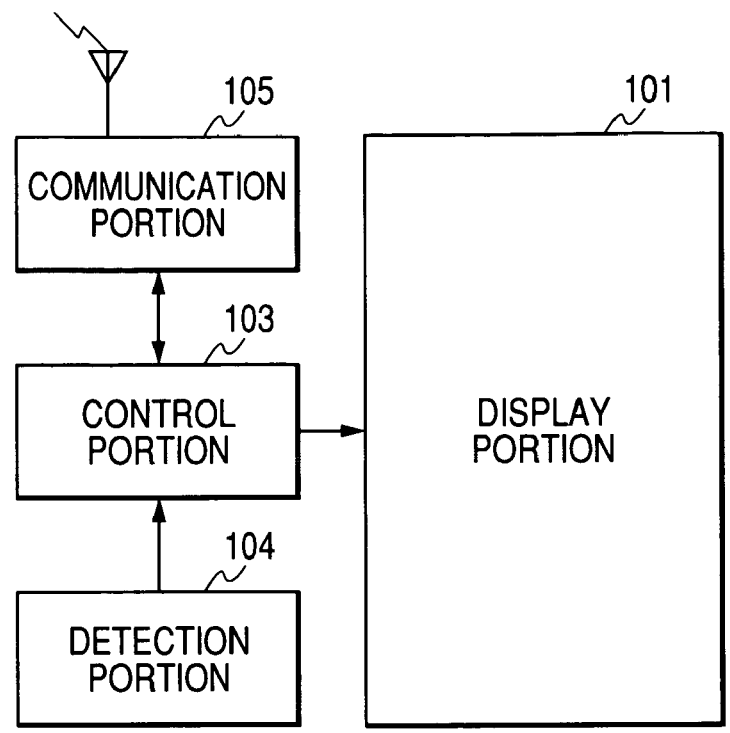
FIG. 6 is a block diagram showing a fourth embodiment of the present invention.

The fourth embodiment will be described. FIG. 6 is a block diagram showing the structure of the display device according to the fourth embodiment of the present invention. The display device of the fourth embodiment is a portable apparatus for perusing electronic information such as data of HTML received via a communication path.

In FIG. 6, reference numeral 101 denotes a display portion, reference numeral 105 denotes a communication portion, reference numeral 103 denotes a control portion and reference numeral 104 denotes a detection portion.

Similar to the other embodiments described above, in the fourth embodiment, information displayed on the display portion 101 is updated in accordance with a shake, a deformation or an impact of the body, detected with the detection portion 104. A different point is that information to be displayed on the display portion 101 is supplied by the communication portion 105 externally from the display device. Namely, the control portion 103 receives a detection signal from the detection portion 104, and when a display update is necessary, requests the communication portion 105 for new electronic information. The communication portion supplies the control portion 103 with electronic information acquired through communications with an external display apparatus. The control portion 103 displays the new electronic information on the display portion to complete the display update.

Fifth Embodiment

Figure 7:
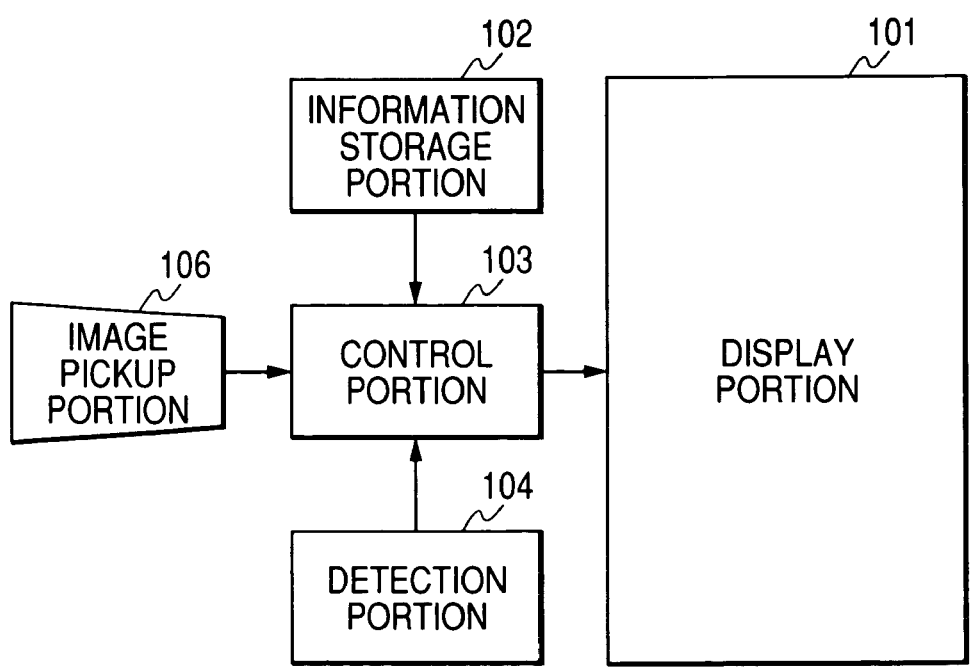
FIG. 7 is a block diagram showing a fifth embodiment of the present invention.

The fifth embodiment will be described. FIG. 7 is a block diagram showing the structure of the display device according to the fifth embodiment of the present invention. The display device of the fifth embodiment is an image pickup device such as a digital camera for capturing a subject image and reproducing and displaying the image.

In FIG. 7, reference numeral 101 denotes a display portion, reference numeral 102 denotes an information storage portion, reference numeral 103 denotes a control portion, reference numeral 104 denotes a detection portion and reference numeral 106 denotes an image pickup portion.

The fifth embodiment has an image pickup mode of capturing a subject image and storing image data in the information storage portion and a reproduction mode of reproducing image data stored in the information storage portion 102 and displaying it on the display portion 101.

Similar to the other embodiments described above, in the reproduction mode, in accordance with an external stimulus detected with the detection portion 104, the contents displayed on the display portion 101 are updated. For example, the reproduced image is displayed in a magnified size in accordance with a body deformation, and a reproduction speed is changed or the image is reproduced in a reverse direction in accordance with a body shake. In the image pickup mode, in accordance with a detection signal detected with the detection portion 104, a hand shake is detected to correct the vibration of the captured image.

In addition to the embodiments described above, the invention may be applied to a system constituted of a plurality of apparatuses (e.g., a host computer, an interface device, a liquid panel and the like) or a single apparatus.

As described above, it is possible to provide a display device which is easy to use intuitively and very compact without using operation buttons or the like.

Many widely different embodiments of the present invention may be constructed without departing from the scope of the present invention. It should be understood that the present invention is not limited to the specific embodiments described in the specification, except as defined in the appended claims.

This application claims priority from Japanese Patent Application No. 2003-413723 filed Dec. 11, 2003, which is hereby incorporated by reference herein.

What is claimed is:

1. A display apparatus comprising:
a display which displays information on a display screen;
a housing body which surrounds the display;
a detector installed in the housing body, which detects a bend position and direction of the housing body being bent along with the display; and
a controller which changes the information to be displayed on the display screen, according to the bend position and direction detected by the detector,
wherein said controller reduces a size of the information to be displayed on the display screen according to the bend position and direction when said housing body is rolled up inward along with said display, and enlarges the size of the information to be displayed on the display screen according to the bend position and direction when said housing body is rolled up outward along with the display.

2. The display apparatus according to claim 1, wherein said controller corrects distortion of the information to be displayed on the display screen, caused by roll-up of said display.

3. The display apparatus according to claim 1, wherein said controller updates the information to be displayed on the display screen, according to the bend position and direction when a corner of said housing body is rolled up upward.

4. The display apparatus according to claim 1, wherein said detector is a twist sensor arranged on at least an upper corner and a lower corner of said housing body.

5. The display apparatus according to claim 1, further comprising:

a communication unit which communicates with an external component, wherein the display can display information received via the communication unit.

6. The display apparatus according to claim 1, further comprising:

an image pickup unit, wherein said display can display an image picked up with the image pickup unit.

* * * * *